No. 698,683. Patented Apr. 29, 1902.
T. DUNCAN.
ELECTRICAL MEASURING INSTRUMENT.
(Application filed Jan. 2, 1900. Renewed Jan. 6, 1902.)
(No Model.)
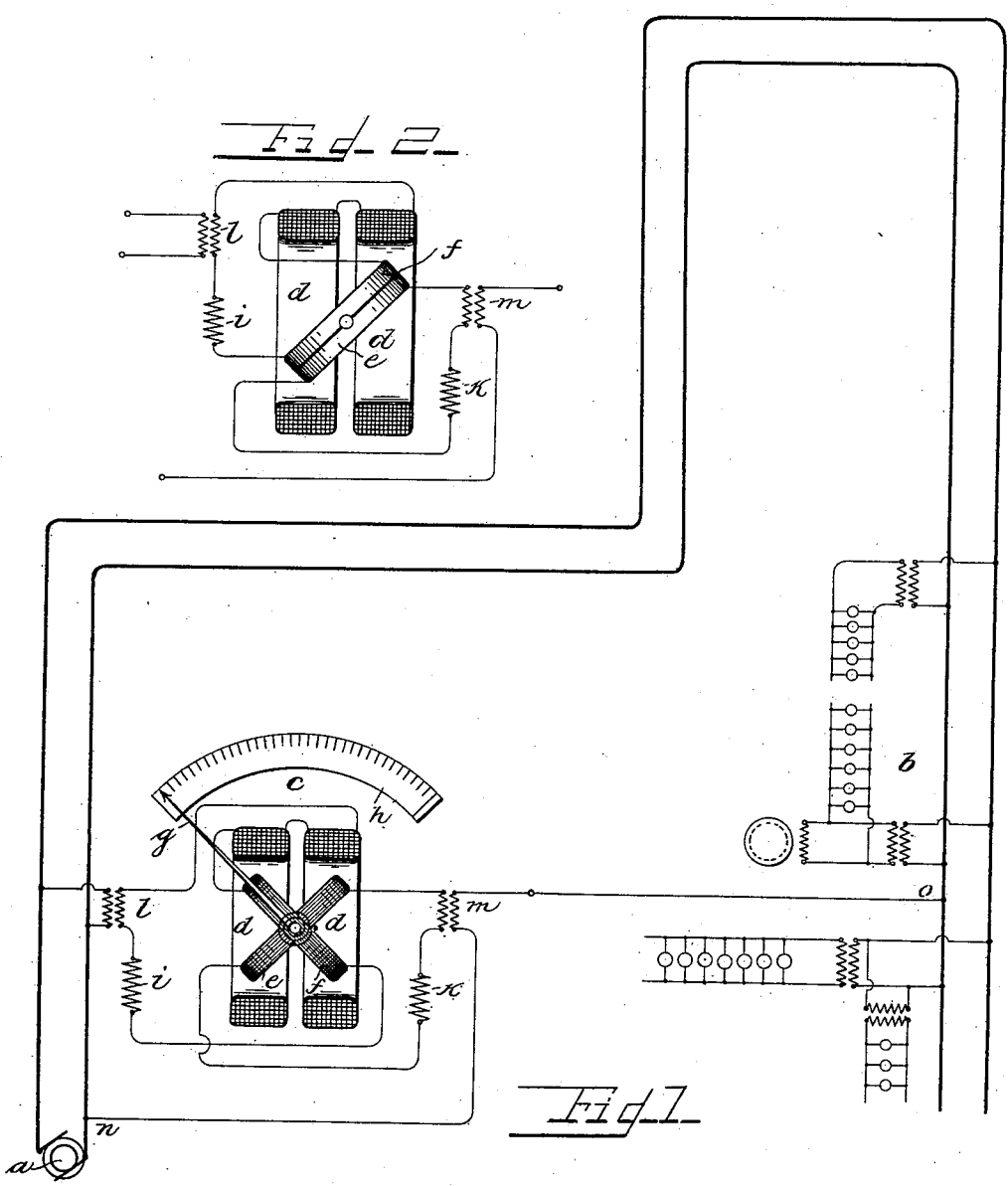
Witnesses
Max Label.
C. J. Schmidt.
Inventor
Thomas Duncan
By Charles A. Brown & Cragg
Attorneys
THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,683, dated April 29, 1902.

Application filed January 2, 1900. Renewed January 6, 1902. Serial No. 88,490. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 345,) of which the following is a full, clear, concise, and exact description, reference being had to the accompanying drawings, forming a part of this specification.

My invention relates primarily to alternating-current systems of distribution, although certain features of the invention may be employed in connection with other systems of distribution; and the invention has for its object the provision of an improved compensating voltmeter which is adapted to accurately determine the pressure at a distant point in a system of transmission.

When the pressure at any point distant from the generating-station is accurately determined, this pressure may be maintained constant by regulation of the impressed pressure to compensate for load changes and the C R drop over the distributing-lines due thereto, which varies directly as the load.

Two ways have hitherto been frequently practiced for measuring the pressure at a predetermined point in the line distant from the generating-station. A common way is to employ an ordinary voltmeter upon the station-switchboard which is connected at the distant point—as, for example, the center of distribution—by means of two pressure-wires, the instrument then indicating the pressure at the distant point. When the distance between the distant predetermined point of the line and the generator-station is great, the expense of these pressure-wires is significant when a great number of machines are used. It has also been the practice to employ a voltmeter included in a circuit with two secondary coils whose primaries are respectively in series with a main transmission-line and bridged between the transmission-lines. This method, however, is objectionable, since the meters do not under all circumstances exactly measure the pressure at distant points, as the effect of the series transformer-coil is the same irrespective of the distribution of the load.

By means of my present invention I am enabled to dispense with a pressure-wire employed in one of the aforesaid prior methods to reduce the cost of line construction and at the same time maintain accuracy in the determination of the pressure at the distant point of distribution, where the pressure is to be measured. I am also enabled to overcome the disadvantages of the second aforesaid prior method of determining the pressure at points distant from the generator-station in that I am enabled to accurately determine this pressure irrespective of the distribution of the load.

In my application Serial No. 90, filed of even date herewith, I have disclosed an instrument comprising two stationary field-coils, one interposed between the generator-terminals and the other interposed between a point of the transmission-circuit near the generator and a distant point of the transmission-circuit, and a third revoluble coil included in series with the coil interposed between the generator-terminals. In my present invention I interpose a revoluble coil between a point of the transmission-circuit and a second point of the transmission-circuit distant therefrom. I preferably employ two stationary field-coils, preferably included in series with each other and interposed between the generator-terminals, a second revoluble coil being preferably employed, which may also be interposed between the generator-terminals, preferably by being included in series with the stationary field-coils. The revoluble coils may be mounted upon a shaft, and in order to measure the movement of these coils a pointer may be attached to the shaft and a scale provided upon which the pointer may indicate the measurements.

The windings of the meter serve to create two component torques, one proportional to the impressed pressure and the other proportional to the C R drop in the line, the movement of the pointer being proportional to the algebraic sum of the effects of the component torques.

I will explain my invention more particularly by reference to the accompanying drawings, in which—

Figure 1 diagrammatically indicates apparatus constructed in accordance with the preferred embodiment of my invention and a system of distribution with which the said apparatus is associated. Fig. 2 is a diagrammatic view showing a modification of an instrument constructed in accordance with my invention.

Like parts are indicated by similar letters of reference in both views.

In Fig. 1 I have illustrated an alternating-current system of distribution, a source of alternating current $a$ being shown as supplying current to translating devices $b$. The instrument $c$ may be constructed as shown in Fig. 1. I have provided a stationary field-winding divided into two coils $d\,d$, between which a shaft is placed, additional coils $e$ and $f$ being fixedly mounted upon the shaft to rotate therewith. A pointer $g$ moves with the revoluble coils, a scale $h$ being provided upon which the pointer may indicate measurements. In order to adapt the instrument to the measurement of voltages in alternating-current systems of electrical distribution, the coils thereof are unprovided with iron cores. Coils $d\,d$ and $f$ form parts of the same windings, these coils being shown in series, although I do not wish to be limited to this series arrangement of the coils.

The instrument illustrated in Fig. 2 is similar to that shown in Fig. 1, except that in Fig. 1 the coils $e$ and $f$ are placed at right angles, while in Fig. 2 they are placed side by side. A resistance $i$ extraneous to the winding, composed of the coils $d\,d$ and $f$, is provided to prevent waste of current, a resistance $k$ for like purpose being also included in series with the winding $e$. Torsional springs may be provided in the well-known way to oppose the torques of the instrument.

In the present instance I have indicated a system of alternating-current distribution of high electromotive force, and instead of connecting the windings of the meter directly between the mains of the system and the conductor interposed between a point of the transmission-circuit $n$, near the generator and a distant point $o$, I employ transformers $l$ and $m$, whose primaries are connected, respectively, between the mains of the system and with the said conductor. This conductor, it will be observed, is in the present instance in shunt of one of the mains. The instrument as thus arranged is adapted to effect a movement of the pointer proportional to the algebraic sum of the impressed pressure and the C R drop. Assuming that there is no load upon the system, the instrument will indicate only the impressed pressure. When a load is put upon the system and as it increases, the current in the winding $e$ will increase proportionally to the drop over the lines. The windings of the meter create opposing torques, the algebraic sum of the effects whereof is indicated by the pointer upon the scale. If, for example, the dynamo-pressure is one hundred and four volts and the drop over the line is four volts, then the resultant volts indicated on the instrument will be one hundred and four volts minus four volts, equaling one hundred volts.

I preferably so adjust the windings of the instrument that the winding receiving current from the conductor joining the points of the transmission-circuit $n$ and $o$ will produce relatively twice the torque for a given pressure impressed at its terminals than that caused by the winding subjected to the generator-pressure.

While I have shown transformers for supplying current to the windings of the instrument, I do not wish to be limited to this particular means.

While I have herein shown and particularly described one embodiment of my invention, it is obvious that changes may readily be effected without departing from the spirit thereof, and I do not, therefore, wish to be limited to the precise construction shown; but,

Having thus described my invention, I claim as new and desire to secure by Letters Patent—

1. In a system of electrical distribution, the combination with an alternating-current generator, of a measuring instrument having a revoluble winding subjected to pressure between a point of the transmission-circuit near the generator and a second distant point of the transmission-circuit where the pressure is to be determined, said instrument also having a second winding subjected to pressure between the generator-terminals, substantially as described.

2. In a system of electrical distribution, the combination with an alternating-current generator, of a measuring instrument having a revoluble winding subjected to pressure between a point of the transmission-circuit near the generator, and a second distant point of the transmission-circuit where the pressure is to be determined, said instrument having a second winding subjected to pressure between the generator-terminals, a pointer and measuring-scale, substantially as described.

3. In a system of electrical distribution, the combination with an alternating-current generator, of a measuring instrument having two windings, one subjected to pressure between the generator-terminals, and the other subjected to pressure between a point of the transmission-circuit near the generator and a second, distant point of the transmission-circuit where the pressure is to be determined, the winding that is subjected to pressure between the generator-terminals being provided with a revoluble coil, the second winding being also revoluble, the revoluble coils being mechanically coupled, substantially as described.

4. In a system of electrical distribution, the combination with an alternating-current generator, of a measuring instrument having two windings, one subjected to pressure between the generator-terminals, and the other subjected to pressure between a point of the transmission-circuit near the generator and a second, distant point of the transmission-circuit where the pressure is to be determined, the winding that is subjected to pressure between the generator-terminals being provided with a revoluble coil, the second winding being also revoluble, the revoluble coils being mechanically coupled, a pointer movable with the revoluble coils, and a measuring-scale, substantially as described.

5. In a system of electrical distribution, the combination with a generator, of a measuring instrument having two windings, one subjected to pressure between the generator-terminals, and the other subjected to pressure between a point of the transmission-circuit near the generator and a second, distant point of the transmission-circuit where the pressure is to be determined, the latter winding or coil, being revoluble, the winding that is subjected to pressure between the generator-terminals being divided into fixed and revoluble coils, the revoluble coils of the instrument being mechanically coupled, substantially as described.

6. In a system of electrical distribution, the combination with a generator, of a measuring instrument having two windings, one subjected to pressure between the generator-terminals, and the other subjected to pressure between a point of the transmission-circuit near the generator and a second, distant point of the transmission-circuit where the pressure is to be determined the latter winding, or coil, being revoluble, the winding that is subjected to pressure between the generator-terminals being divided into fixed and revoluble coils, the revoluble coils of the instrument being mechanically coupled, a pointer movable with the revoluble coils, and a measuring-scale, substantially as described.

7. In a system of electrical distribution, the combination with a generator, of a measuring instrument having two windings, one subjected to pressure between the generator-terminals, and the other subjected to pressure between a point of the transmission-circuit near the generator and a second, distant point of the transmission-circuit where the pressure is to be determined, the latter winding, or coil, being revoluble, the winding that is subjected to pressure between the generator-terminals being divided into fixed and revoluble coils, the revoluble coils of the instrument being mechanically coupled, all of the revoluble coils being subjected to the action of the fixed winding portion, substantially as described.

8. In a system of electrical distribution, the combination with a generator, of a measuring instrument having two windings, one subjected to pressure between the generator-terminals, and the other subjected to pressure between a point of the transmission-circuit near the generator and a second, distant point of the transmission-circuit where the pressure is to be determined, the latter winding, or coil, being revoluble, the winding that is subjected to pressure between the generator-terminals being divided into fixed and revoluble coils, the revoluble coils of the instrument being mechanically coupled, all of the revoluble coils being subjected to the action of the fixed winding portion, a pointer movable with the revoluble coils, and a measuring-scale, substantially as described.

In witness whereof I hereunto subscribe my name this 20th day of December, A. D. 1899.

THOMAS DUNCAN.

Witnesses:
WILLIAM F. MEYER,
JAMES W. DALTON.